US 8,833,093 B2

(12) United States Patent
Tarr

(10) Patent No.: US 8,833,093 B2
(45) Date of Patent: Sep. 16, 2014

(54) METHOD OF CONTROLLING TEMPERATURE IN A COMPARTMENT OF A REFRIGERATOR

(75) Inventor: Ronald Scott Tarr, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1072 days.

(21) Appl. No.: 12/326,146

(22) Filed: Dec. 2, 2008

(65) Prior Publication Data

US 2010/0138073 A1    Jun. 3, 2010

(51) Int. Cl.
*F25C 1/00*    (2006.01)
*F25D 29/00*    (2006.01)
*G05D 23/19*    (2006.01)
*F25D 11/02*    (2006.01)
*F25C 5/18*    (2006.01)

(52) U.S. Cl.
CPC ............. *G05D 23/19* (2013.01); *F25C 2400/10* (2013.01); *F25D 2323/021* (2013.01); *F25D 29/00* (2013.01); *F25D 2700/121* (2013.01); *F25D 11/025* (2013.01); *F25C 5/187* (2013.01); *F25C 2600/04* (2013.01)
USPC ................. 62/135; 62/137; 62/187; 62/201

(58) Field of Classification Search
CPC .......... G05D 23/19; G05D 9/00; G05D 9/12; F25D 11/025; F25D 17/065; F25D 29/00; F25D 2323/021; F25D 2700/121; F25C 5/187; F25C 2400/10; F25C 2600/04
USPC ............................ 62/135, 137, 185, 187, 201
See application file for complete search history.

(56) References Cited

U.S. PATENT DOCUMENTS

| | | | | |
|---|---|---|---|---|
| 4,980,673 | A * | 12/1990 | Kleven | 340/581 |
| 5,987,897 | A * | 11/1999 | Hall | 62/59 |
| 6,769,265 | B1 * | 8/2004 | Davis et al. | 62/228.4 |
| 6,772,601 | B1 * | 8/2004 | Davis et al. | 62/187 |
| 7,188,479 | B2 * | 3/2007 | Anselmino et al. | 62/66 |
| 2007/0119193 | A1 * | 5/2007 | Davis et al. | 62/135 |
| 2008/0148761 | A1 * | 6/2008 | Venkatakrishnan et al. | 62/340 |
| 2009/0151375 | A1 * | 6/2009 | Tarr et al. | 62/180 |
| 2009/0165471 | A1 * | 7/2009 | Rafalovich et al. | 62/66 |

* cited by examiner

*Primary Examiner* — Marc Norman
*Assistant Examiner* — Paolo Gonzalez
(74) *Attorney, Agent, or Firm* — Douglas D. Zhang; Global Patent Operation

(57) ABSTRACT

A method of controlling temperature in a compartment of a refrigerator is disclosed. During a normal operation of the refrigerator, the compartment is cooled by a temperature control circuit operated in accordance with a predetermined thermodynamic cycle. The method includes the steps of measuring a variable parameter of the compartment, and comparing the variable parameter with a threshold, and if the variable parameter is greater than the threshold, continuing to operate the temperature control circuit in accordance with the predetermined thermodynamic cycle.

16 Claims, 7 Drawing Sheets

METHOD OF CONTROLLING TEMPERATURE IN A COMPARTMENT OF A REFRIGERATOR

BACKGROUND OF THE INVENTION

The present invention relates generally to refrigerators. More particularly, the present invention relates to a method of controlling the temperature in an ice compartment of a refrigerator.

It is now common practice in the art of refrigerators to provide an automatic icemaker. In a "side-by-side" type refrigerator where the freezer compartment is arranged to the side of the fresh food compartment, the icemaker is usually disposed in the freezer compartment and ice is usually dispensed through an opening in the access door of the freezer compartment. In this arrangement, ice is formed by freezing water with cold air in the freezer compartment, the air being made cold by the primary temperature control circuit or system of the refrigerator which includes an evaporator.

In a "bottom freezer" type refrigerator where the freezer compartment is arranged below a fresh food compartment, convenience necessitates that the icemaker be disposed in an ice compartment on the access door of the top mounted fresh food compartment and ice be delivered through an opening in the access door of the fresh food compartment, rather than through the access door of the freezer compartment. However, the air in the fresh food compartment is generally not cold enough to freeze water to form ice. Therefore, a working medium, such as air or a mixture of propylene glycol and water, is usually used to cool the icemaker. The working medium is delivered to the ice compartment through a secondary temperature control circuit to maintain the icemaker at a temperature below the freezing point of water.

More particularly, when the working medium is air, the primary temperature control circuit cools the air in the freezer compartment to a predetermined temperature. The cooled air is then supplied to the ice compartment from the freezer compartment through a secondary temperature control circuit which is operated in accordance with a selected thermodynamic cycle. In this case, the secondary temperature control circuit includes an air supply path extending from the freezer compartment to the ice compartment, an air return path extending from the ice compartment to the freezer compartment, and a fan or blower for moving the air in the supply path and the return path.

When the working medium is a food safe liquid in the nature of a mixture of propylene glycol and water, a different kind of secondary temperature control circuit is used. This kind of secondary temperature control circuit will be discussed in detail below when the exemplary embodiments of the present invention are described.

Putting the icemaker in the ice compartment on the access door for the fresh food compartment presents many new challenges not previously encountered because of the temperature difference between the ice compartment and the fresh food compartment. For example, if there is no ice in the ice compartment, then keeping the secondary temperature control circuit operating would certainly waste energy. On the other hand, if there is ice left in the ice compartment, the ice would melt if the secondary temperature control circuit is turned off (in some of the known "bottom freezer" refrigerators, turning off the icemaker will automatically terminate the operation of the secondary temperature control circuit). Upon melting, the water would leak within and/or out of the ice compartment. Of course, a user can find out whether the ice compartment has ice before deciding whether to terminate the operation of the secondary temperature control circuit, but such approach is inconvenient to the user because the user needs to open both the access door of the fresh food compartment and the access door of the ice compartment.

BRIEF DESCRIPTION OF THE INVENTION

As described herein, the exemplary embodiments of the present invention overcome one or more of the above or other disadvantages known in the art.

One aspect of the present invention relates to a method of controlling temperature in a compartment of a refrigerator. During a normal operation of the refrigerator, the compartment is cooled by a temperature control circuit operated in accordance with a predetermined thermodynamic cycle. The method includes the steps of measuring a variable parameter of the compartment, and comparing the variable parameter with a threshold, and if the variable parameter is less than the threshold, continuing to operate the temperature control circuit in accordance with the predetermined thermodynamic cycle.

Another aspect relates to a method of controlling temperature in an ice compartment of a refrigerator. The ice compartment stores ice produced by an icemaker. During a normal operation of the refrigerator, the ice compartment is cooled by a temperature control circuit operated in accordance with a predetermined thermodynamic cycle. The method includes the steps of measuring a variable parameter of the ice compartment, and comparing the variable parameter with a threshold, and if the variable parameter is less than the threshold, continuing to operate the temperature control circuit in accordance with the predetermined thermodynamic cycle.

Yet another aspect relates to a method of controlling temperature in an ice compartment disposed inside a fresh food compartment of a refrigerator. The refrigerator has a primary temperature control circuit for cooling the fresh food compartment and a secondary temperature control circuit which, during a normal operation of the refrigerator, is operated in accordance with a predetermined thermodynamic cycle to cool the ice compartment. The method includes the steps of measuring a variable parameter of the ice compartment; and comparing the variable parameter with a threshold, and if the variable parameter is less than the threshold, continuing to operate the secondary temperature control circuit in accordance with the predetermined thermodynamic cycle, and if the variable parameter substantially matches the threshold, terminating operation of the secondary temperature control circuit.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS OF THE INVENTION

Figure 1:
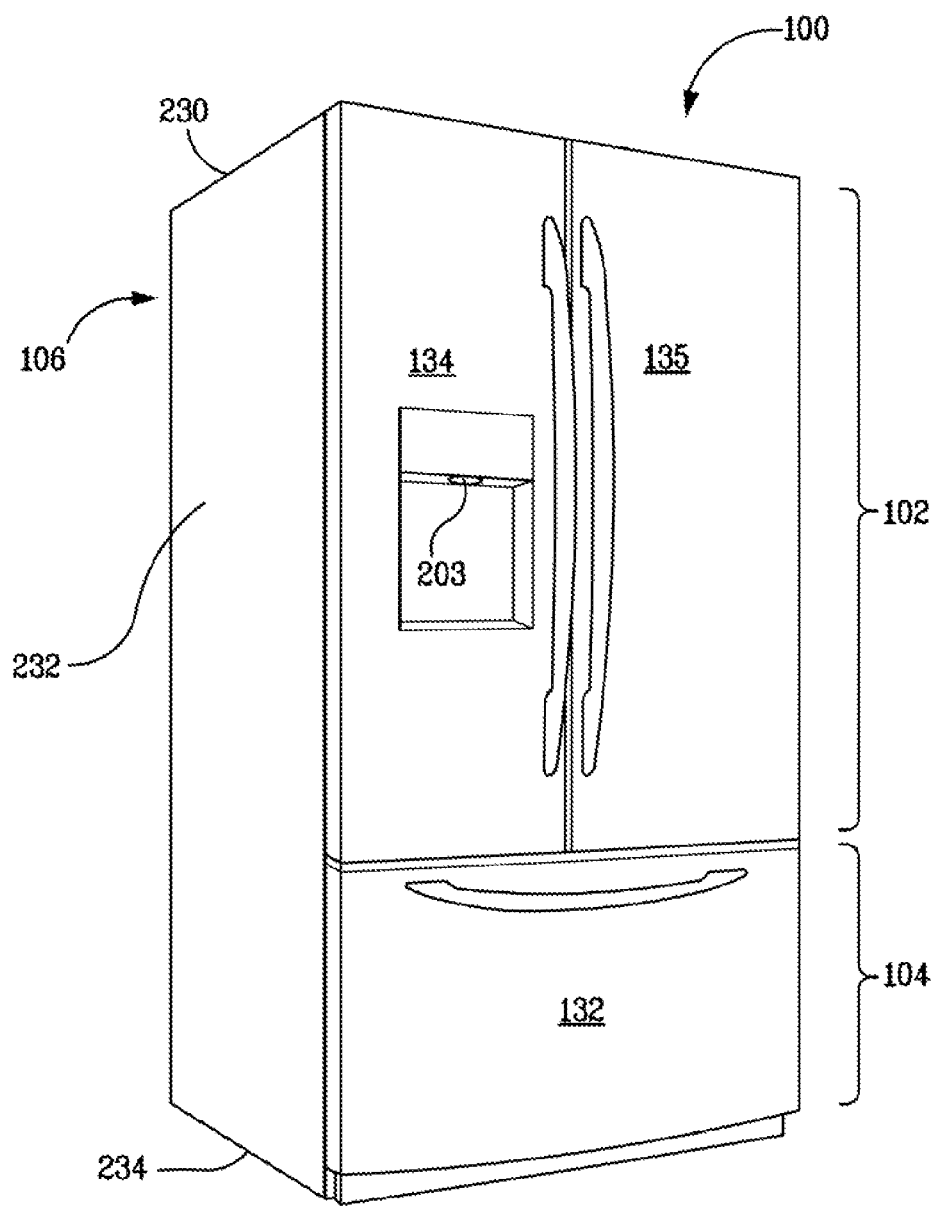
FIG. 1 is a perspective view of an exemplary "bottom freezer" refrigerator.
Figure 2:
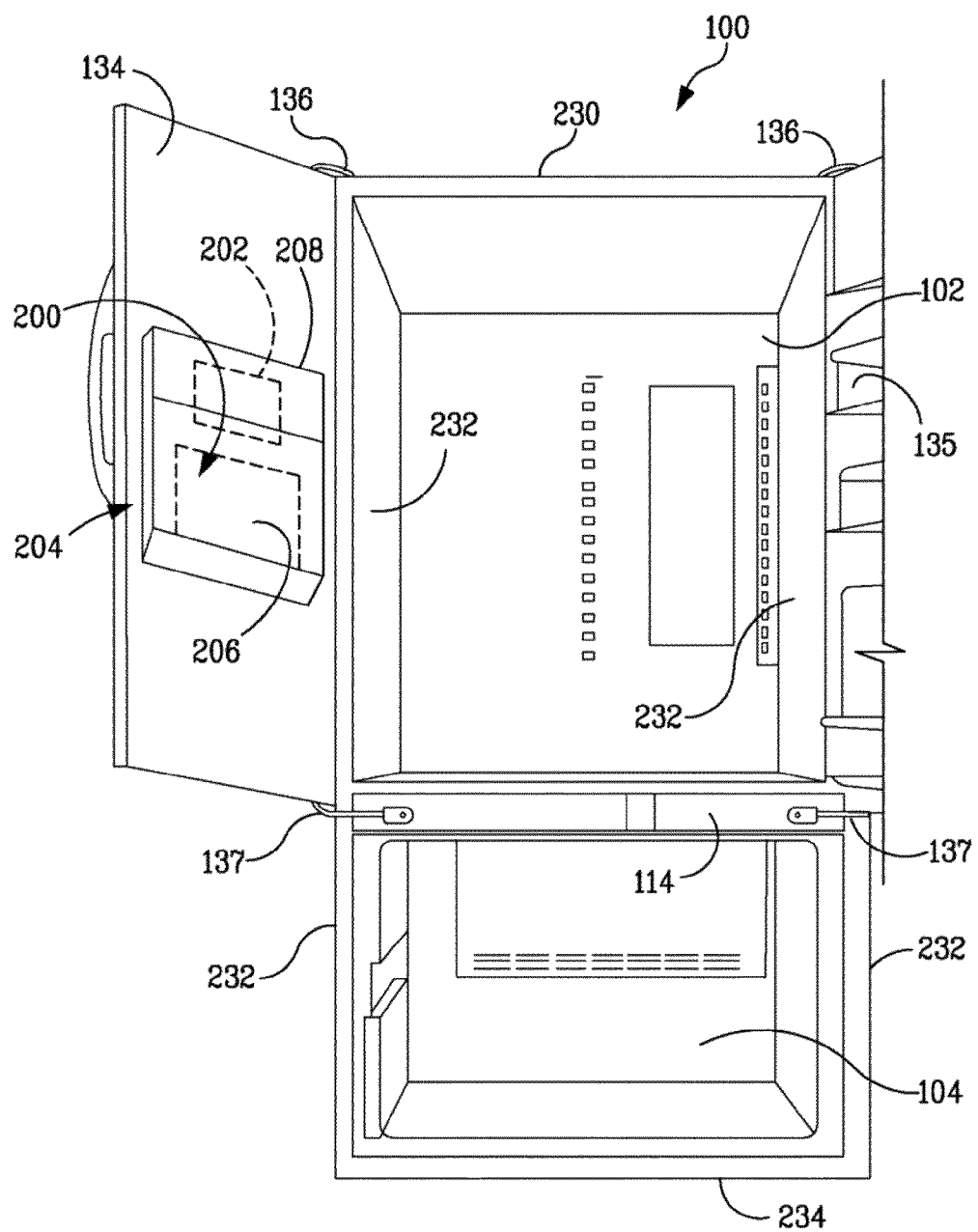
FIG. 2 is a simplified, perspective view of the refrigerator of FIG. 1 with the access doors of the fresh food compartment being in an open position and the drawer for the freezer compartment being removed for clarity.

FIGS. 1 and 2 illustrate an exemplary refrigerator 100 which includes a fresh food compartment 102 and a freezer compartment 104. The refrigerator 100 is coolable by a conventional vapor-compression temperature control circuit. Although the refrigerator 100 is shown as the "bottom freezer" type, the teaching of the description set forth below is applicable to other types of refrigeration appliances, including but not limited to, side-by-side refrigerators. The present invention is therefore not intended to be limited to any particular type or configuration of a refrigerator.

The freezer compartment 104 and the fresh food compartment 102 are arranged in a bottom mount configuration where the freezer compartment 104 is disposed or arranged beneath or below the fresh food compartment 102. The fresh food compartment 102 is shown with French doors 134 and 135. However, a single access door can be used instead of the French doors 134, 135. The freezer compartment 104 is closed by a drawer or an access door 132.

The fresh food compartment 102 and the freezer compartment 104 are contained within a main body including an outer case 106. The outer case 106 can be formed by folding a sheet of a suitable material, such as pre-painted steel, into a generally inverted U-shape to form a top 230 and two sidewalls 232 of the outer case 106. A mullion 114, best shown in FIG. 2, which is for example formed of an extruded ABS material, connects the two sidewalls 232 to each other and separates the fresh food compartment 102 from the freezer compartment 104. The outer case 106 also has a bottom 234, which connects the two sidewalls 232 to each other at the bottom edges thereof, and a back (not shown). As is known in the art, a thermally insulating liner is affixed to the outer case 106.

The access door 132 and the French doors 134, 135 close access openings to the freezer compartment 104 and the fresh food compartment 102, respectively.

Each French door 134, 135 is mounted to the main body by a top hinge 136 and a corresponding bottom hinge 137, thereby being rotatable about its outer vertical edge between an open position for accessing the respective part of the fresh food compartment 102, as shown in FIG. 2, and a closed position for closing the respective part of the fresh food compartment 102, as shown in FIG. 1.

Similarly, when an access door 132 is used for the freezer compartment 104, it is rotatably attached to the main body in a known fashion. When a drawer is used for the freezer compartment, it is slidably received in the cavity defined by the sidewalls 232, the mullion 114 and the bottom 234 in a known fashion.

As illustrated in FIG. 2, an ice making assembly 200 is mounted on the interior surface of the access door 134 of the fresh food compartment 102 (of course, the ice making assembly 200 can be mounted on the access door 135 instead). The ice making assembly 200 includes a thermally insulated ice compartment 204 mounted or formed on the access door 134, and an icemaker 202 disposed in the ice compartment 204 (alternatively, the icemaker 202 may be disposed in the freezer compartment 104 and connected to or in communication with the ice compartment 204 through a channel). Water is provided to ice molds of the icemaker 202 through a water supply conduit (not shown) extending from the main body of the refrigerator to the icemaker 202, and then is frozen into ice cubes. Then the ice cubes are usually discharged from the icemaker 202 and stored in an ice storage bin 206 until needed by a user. The ice storage bin 206 is disposed in the ice compartment 204, below the icemaker 202. The ice cubes may be withdrawn by accessing the ice compartment 204 through an access door 208 which faces the fresh food compartment 102 when the access door 134 is closed. However, the ice cubes are typically withdrawn by using an ice dispenser (not shown) installed in the access door 134 through an opening 203 (shown in FIG. 1) formed on the exterior surface of the French door 134. The opening 203 faces away from the fresh food compartment 102 when the access door 134 is closed and is formed at a height facilitating convenient access to the ice. These are known in the art and therefore will not be discussed in detail here.

Because the ice compartment 204 is located in the fresh food compartment 102 which normally has a temperature higher than the freezing point of water, warming of the interior of the ice compartment 204 occurs. To counter this warming, a secondary temperature control circuit is used to circulate a working medium to and from the icemaker 202 and/or the ice compartment 204. When the working medium is a liquid, such as a food safe liquid in the nature of a mixture of propylene glycol and water, the second temperature control circuit 140 includes a first heat exchanger 141 disposed in the freezer compartment 104, a second heat exchanger 142 disposed in the ice compartment 204 and thermally coupled to the ice molds of the icemaker 202, a supply conduit 143 and a return conduit 144 between the first and second heat exchangers 141, 142, and a working medium moving device such as pump 145 for circulating the working medium in the second temperature control circuit 140. The working medium is cooled when it passes through the first heat exchanger 141. The pump 145 forces the cooled working medium to pass through the second heat exchanger 142 to keep the temperature of the icemaker 202 and/or the ice compartment 204 below the freezing point of water. The second temperature control circuit is discussed in greater detail in commonly owned application Ser. No. 11/958,900, filed Dec. 18, 2007, the entire content of which is incorporated herein by reference.

When the working medium is air, the secondary temperature control circuit 140' includes a supply path 143' and a return path 144' between the freezer compartment 104 and the ice compartment 204, and a working medium moving device such as fan 146 for causing cooling air in the freezer compartment 104 to flow to the ice compartment 204 via the supply path 143' and the air in the ice compartment 204 to flow back to the freezer compartment 104 via the return path 144'. This configuration is known in the art, and therefore will not be discussed further here.

Figure 3:
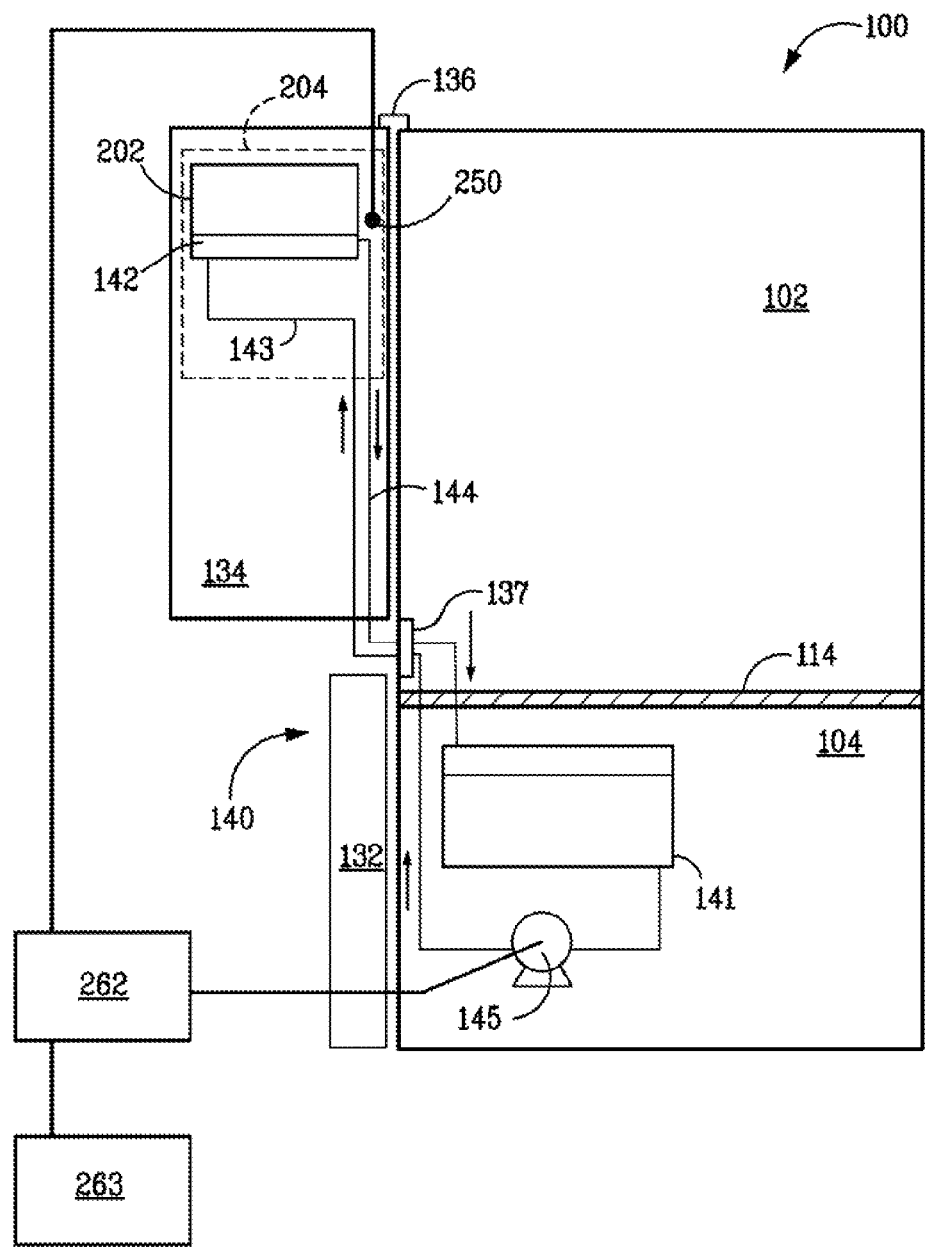
FIG. 3 schematically shows an exemplary secondary temperature control circuit used in the refrigerator of FIG. 1.
Figure 4:
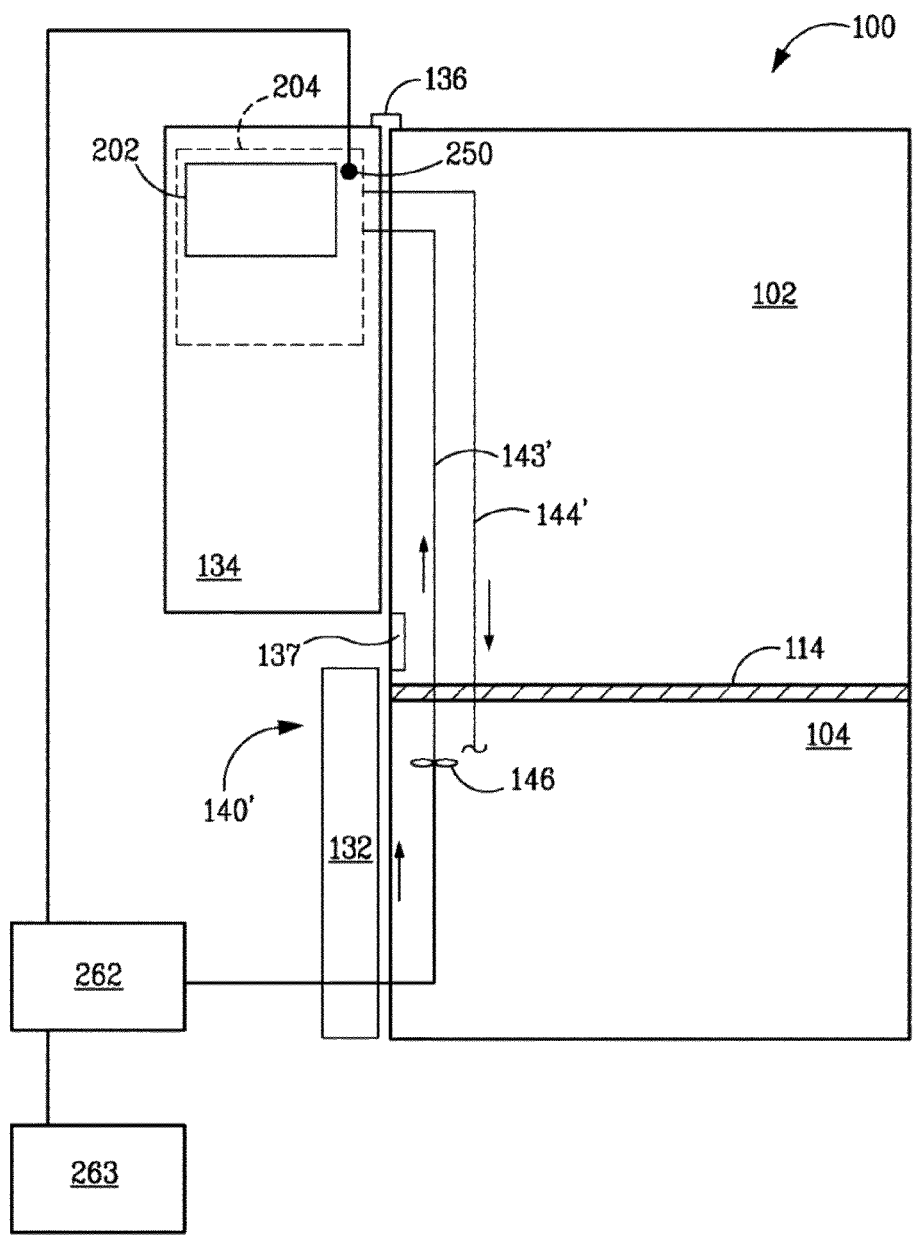
FIG. 4 schematically shows another secondary temperature control circuit that can be used in the refrigerator of FIG. 1.

Regardless the type of secondary temperature control circuit is chosen, the secondary temperature control circuit 140, 140' is usually operated in accordance with a predetermined thermodynamic cycle. Generally, the secondary temperature control circuit 140, 140' is not always on. Rather, it is activated from time to time to maintain the temperature in the ice compartment 204 below the freezing point of water. More specifically, the secondary temperature control circuit 140, 140' is activated or deactivated based on the temperature in the ice compartment 204. The temperature in the ice compartment 204 is measured by a temperature sensor such as thermostat 250 (see FIGS. 3 and 4) disposed in the ice compartment 204, and a controller 262 activates or deactivates the working medium moving device 145, 146 based on the temperature reading of the thermostat 250.

An exemplary operation of the secondary temperature control circuit 140 will be discussed below in connection with FIG. 5, which illustrates the temperature changing patterns in the ice compartment 204 during normal operation when the ice compartment 204 contains 3 lbs of ice and when it contains no ice. More specifically, chart 410 depicts the temperature-changing pattern in the ice compartment 204 when it contains no ice. During the normal operation, the secondary temperature control circuit 140 is not always on. Rather, it is operated in accordance with a predetermined thermodynamic cycle.

For example, the controller 262 turns off or deactivates the secondary temperature control circuit 140 by turning off the pump 145 once the reading from the thermostat 250 indicates that the temperature of the ice compartment 204 reaches a predetermined lower temperature limit T1, such as approximately 8° F., for example. Immediately after such deactivation, the temperature in the ice compartment 204 might continue to fall due to the working medium remaining in the ice compartment 204. But shortly after such deactivation, the temperature in the ice compartment 204 will start to rise until it reaches a predetermined higher temperature limit T2 (approximately 16° F., for example). This is the warming phase of the thermodynamic cycle. As should be appreciated, when the operation of the secondary temperature control circuit 140 is terminated, the temperature in the ice compartment 204 will rise in a similar fashion at least until it reaches the predetermined higher temperature limit T2. When the temperature in the ice compartment 204 reaches the predetermined higher temperature limit T2, which is sensed by the thermostat 250 and fed to the controller 262, the controller 262 turns on or activates the secondary temperature control circuit 140 by turning on the pump 145. Immediately after such activation, the temperature in the ice compartment 204 might continue to rise. However, shortly after the activation, the temperature in the ice compartment 204 will decline until the predetermined lower temperature limit T1 is reached again. This is the cooling phase of the thermodynamic cycle. At that point, the controller 262 will turn off or deactivate the secondary temperature control circuit 140 again. This thermodynamic cycle will repeat, generating a plurality of peaks 412 and a plurality of minimums 413.

Figure 5:
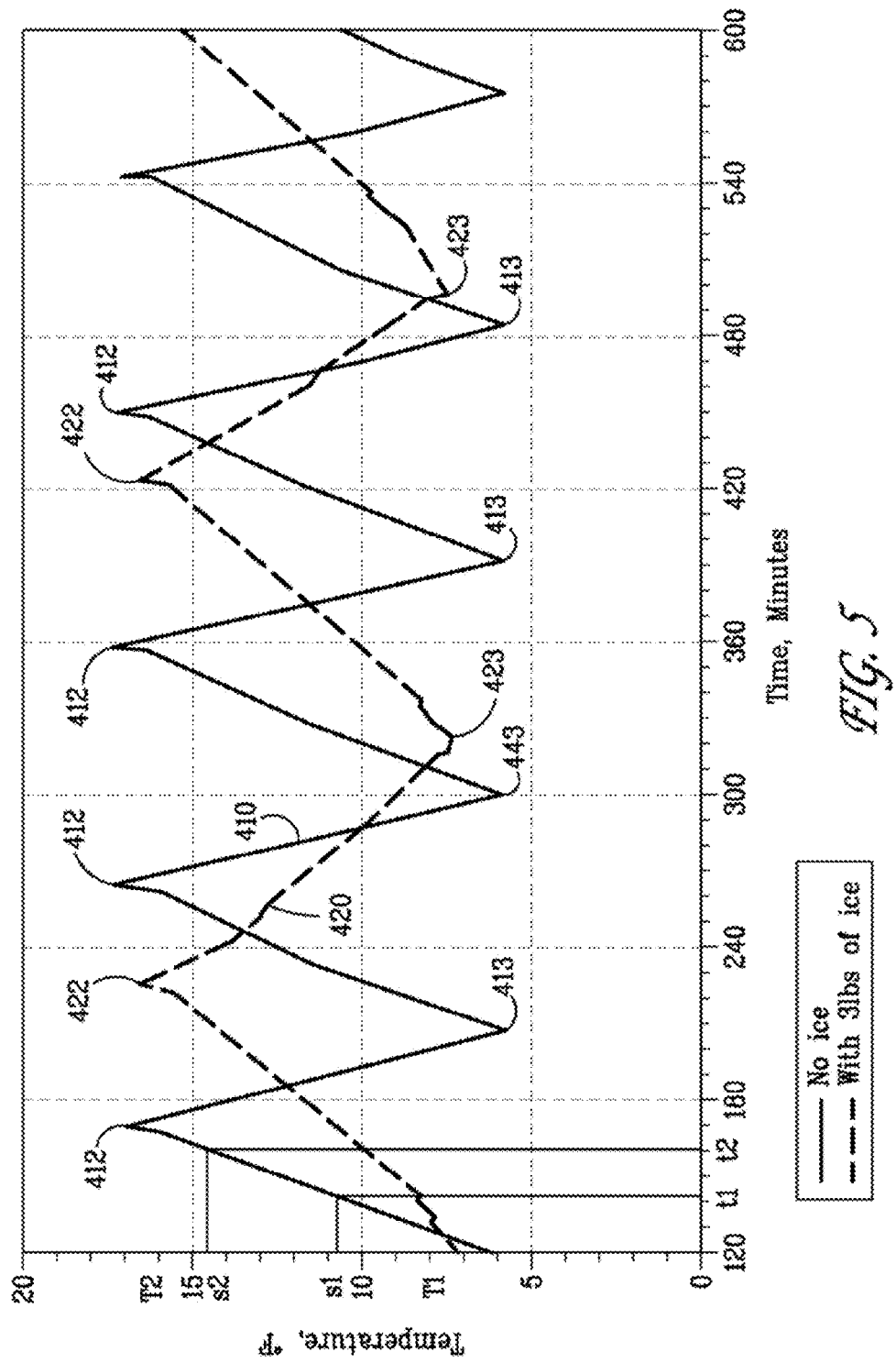
FIG. 5 shows two temperature-changing patterns in the ice compartment of FIG. 1.

The chart 420 in FIG. 5 depicts the temperature-changing pattern in the ice compartment 204 when the ice compartment 204 contains approximately 3 lbs of ice. The secondary temperature control circuit 104 is operated in accordance with the same thermodynamic cycle discussed above. Like the chart 410, chart 420 has a plurality of peaks 422 and minimums 423.

As indicated in both charts 410, 420, the temperature in the ice compartment 204 rises or falls in a substantially linear fashion during the warming or cooling phase. As clearly illustrated in FIG. 5, during the warming phase, the rate of temperature change in the ice compartment 204 containing 3 lbs of ice is slower than that when the ice compartment 204 contains no ice. The same is true during the cooling phase.

The rate of temperature change in the ice compartment 204 can be easily determined by the controller 262 based on the readings of the thermostat 250. For example, during the warming phase, the reading of the thermostat 250 is s1 at t1 point in time, and s2 at t2 point in time. Then the rate of temperature change in the ice compartment 204 is:

$$V2=(s2-s1)/(t2-t1).$$

Figure 6:
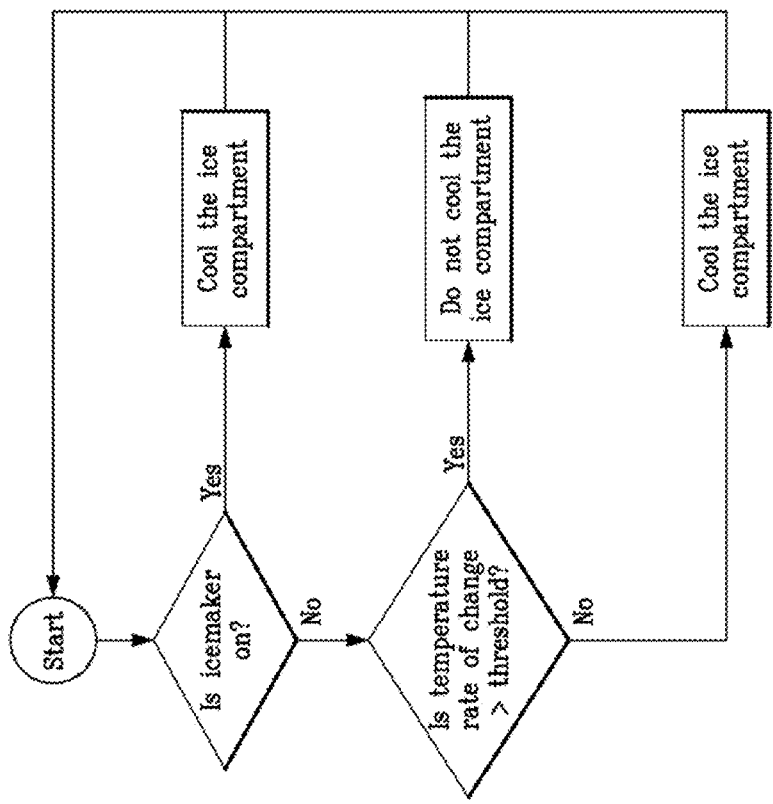
FIGS. 6 and 7 are flowcharts of the controller for the secondary temperature control circuit shown in FIG. 3.

This difference in the temperature change speed can be used for various purposes. For example, it can be used to detect the presence of ice in the ice compartment 204 and/or to determine whether the operation of the secondary temperature control circuit 140 should be continued. When the ice compartment 204 is substantially free of ice, its temperature-changing speed or rate V can be determined easily. This determined temperature-changing speed or rate V is stored in the controller 262 and used as a threshold. During normal operation of the secondary temperature control circuit 140, the temperature-changing speed V1 in the ice compartment 204 is determined. The controller 262 then compares V1 with V. If V1 substantially matches V, the controller 262 will conclude that the ice compartment 204 does not contain ice, and will terminate the operation of the secondary temperature control circuit 140 when a user turns off or deactivates the icemaker 202. On the other hand, if V1 is less than V, the controller 262 will conclude that the ice compartment 202 contains ice, and will continue to operate the secondary temperature control circuit 140 in accordance with the predetermined thermodynamic cycle even if a user turns off or deactivates the icemaker 202. See the flowchart shown in FIG. 6. Here V1 is a variable parameter, which changes depending on the amount of ice in the ice compartment 204.

Figure 7:
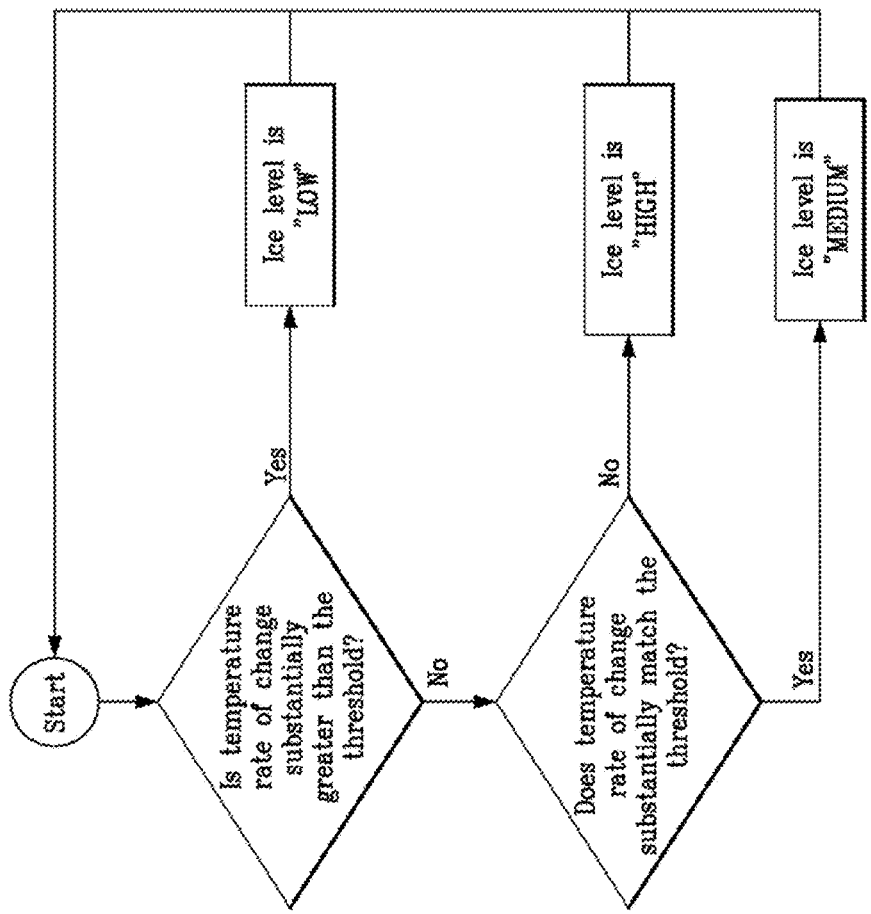

The controller 262 can also generate a warning signal, through an output device such as a display 263, to warn a user that there is ice in the ice compartment 204 so that the user knows he or she should not turn off or deactivate the icemaker 202. The display 263 is preferably arranged on the exterior surface of the access door 134. The display 263 can also indicate the quantity of the ice in the ice compartment 204. For example, if V is the rate of temperature change in the ice compartment 204 when it contains approximately half of the maximum load of ice, then the controller 262 will indicate, through the display 263, the ice level as "medium" if the determined V1 is approximately equal to V, "low" if V1 is substantially higher than V, or "high" if V1 is substantially lower than V. See the flowchart shown in FIG. 7.

Additionally you can compare the variable parameter to one or more thresholds to estimate the amount of "stuff" in a compartment. This information can then be displayed to the consumer. As discussed above, this applies to stored ice. It may also apply to any items that are added to a compartment. For example, if ice cream is stored in a special compartment (set at 20° F. for example) the display could indicate whether the compartment is full or empty, or even half-empty. This can all be done by noting the rate of change of the temperature in the compartment.

Additionally, the controller 262 can be set so that when a user turns off or deactivate the icemaker 202 (in a conventional setting, turning off the icemaker will automatically terminate the operation of the secondary temperature control circuit), the thermostat 250 will continue to measure the temperature in the ice compartment 204 for at least a predetermined period of time, and the controller 262 will use the readings of the thermostat 250 and the time interval between such readings to determine the temperature-changing speed V1 in the ice compartment 204. If V1 is substantially equal to V, which indicates there is no ice in the ice compartment 204, the controller 262 will follow the user's shut down instruction and terminates the operation of the secondary temperature control circuit 140. On the other hand, if V1 is greater than V, which indicates the presence of ice in the ice compartment 204, the controller 262 will override the user's shut down instruction and continue to operate the secondary temperature control circuit 140 in accordance with the predetermined thermodynamic cycle to prevent the ice from melting.

Other aspects of the temperature-changing patterns can also be utilized. For example, a duration of an event can be used to detect whether there is ice in the ice compartment 204. In some embodiments, the variable parameter to be considered is a duration of an event during the predetermined thermodynamic cycle, and the threshold to be considered is a duration of an event during the predetermined thermodynamic cycle, which is characteristic of the ice compartment containing substantially no ice. More specifically, the accumulated occurrence of a particular event may be measured over a period of time. For example, the duration or time between two adjacent temperature peaks can be used to detect the presence of ice in the ice compartment 204 because the duration will vary depending on the amount of ice in the ice compartment 204. Compare the two charts in FIG. 5. Events which may be counted include but are not limited to temperature peaks or minimums, warming or cooling cycles of the secondary temperature control circuit 140, or a combination of these events.

Thus, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. For example, the method or process discussed above in connection with the secondary temperature control circuit 140 is equally applicable to the secondary temperature control circuit 140'. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of controlling temperature in a compartment of a refrigerator, the compartment being cooled by a temperature control circuit cycled by a controller in accordance with a predetermined thermodynamic cycle, the method comprising the steps of: determining by the controller a variable parameter of the compartment, the variable parameter being a rate of temperature change in the compartment; comparing the variable parameter with a threshold, the threshold being a rate of temperature change in the compartment characteristic of a substantially empty compartment, and a first condition wherein the variable parameter is less than the threshold, determining by the controller that a fill level of the compartment does not indicate a substantially empty compartment, and a second condition wherein the variable parameter substantially matches the threshold, determining by the controller that the fill level of the compartment indicates a substantially empty compartment; receiving at the controller a request to at least one of deactivate or turn off cooling of the compartment; responsive to receiving the request when the determined fill level indicates a substantially empty compartment, terminating by the controller cycling of the temperature control circuit; and responsive to receiving the request when the determined fill level does not indicate a substantially empty compartment, continuing by the controller cycling of the temperature control circuit by activating and deactivating the temperature control circuit in accordance with the predetermined thermodynamic cycle.

2. A method of controlling temperature in an ice compartment of a refrigerator, the ice compartment storing ice produced by an icemaker, the icemaker being selectively turned on and off, the ice compartment being cooled by a temperature control circuit cycled by a controller in accordance with a predetermined thermodynamic cycle, the method comprising the steps of: determining by the controller a variable parameter of the ice compartment, the variable parameter being a rate of temperature change in the ice compartment; comparing the variable parameter with a threshold, the threshold being a rate of temperature change in the ice compartment when the ice compartment contains substantially no ice, and a first condition wherein the variable parameter is less than the threshold, determining by the controller that a fill level of the ice compartment does not indicate a substantially empty ice compartment, and a second condition wherein the variable parameter substantially matches the threshold, determining by the controller that the fill level of the compartment indicates a substantially empty ice compartment; receiving at the controller a request to turn off the icemaker; responsive to receiving the request when the determined fill level indicates a substantially empty ice compartment, terminating by the controller cycling of the temperature control circuit; and responsive to receiving the request when the determined fill level does not indicate a substantially empty ice compartment, continuing by the controller cycling of the temperature control circuit by activating and deactivating the temperature control circuit in accordance with the predetermined thermodynamic cycle.

3. The method of claim 2, wherein the predetermined thermodynamic cycle comprises a warming phase and a cooling phase, the variable parameter being determined during one of the warming phase and the cooling phase.

4. The method of claim 3, wherein the variable parameter is determined when the icemaker is turned off.

5. The method of claim 3, wherein the threshold is determined during the one of the warming phase and the cooling phase.

6. The method of claim 2, further comprising generating by the controller a warning signal responsive to receiving the request when the determined fill level does not indicate a substantially empty ice compartment, the warning signal indicating that there is ice in the ice compartment.

7. The method of claim 2, wherein the controller continues to cycle the temperature control circuit comprises cycling the temperature control circuit in accordance with the predetermined thermodynamic cycle when the icemaker is turned off.

8. The method of claim 2, wherein the ice compartment is on an access door for a fresh food compartment of the refrigerator.

9. A method of controlling temperature in an ice compartment disposed inside a fresh food compartment of a refrigerator, the refrigerator comprising a controller, a primary temperature control circuit for cooling the fresh food compartment and a secondary temperature control circuit which is cycled by the controller in accordance with a predetermined thermodynamic cycle to cool the ice compartment, the method comprising the steps of: determining by the controller a variable parameter of the ice compartment, the variable parameter being a rate of temperature change in the ice compartment; comparing the variable parameter with a threshold, the threshold being a rate of temperature change in the ice compartment when the ice compartment contains substantially no ice, and a first condition wherein the variable parameter is less than the threshold, determining by the controller that a fill level of the ice compartment does not indicate a substantially empty ice compartment, and a second condition wherein the variable parameter substantially matches the threshold, determining by the controller that the fill level of the ice compartment indicates a substantially empty ice compartment; receiving at the controller a request to at least one of deactivate or turn off cooling of the ice compartment; responsive to receiving the request when the determined fill level indicates a substantially empty ice compartment, terminating by the controller cycling of the secondary temperature control circuit; and responsive to receiving the request when the determined fill level does not indicate a substantially empty ice compartment, continuing by the controller cycling of the secondary temperature control circuit by activating and deactivating the secondary temperature control circuit in accordance with the predetermined thermodynamic cycle.

10. The method of claim 9, wherein the predetermined thermodynamic cycle comprises a warming phase and a cooling phase, the variable parameter being determined during one of the warming phase and the cooling phase.

11. The method of claim 10, wherein the threshold is determined during the one of the warming phase and the cooling phase.

12. The method of claim 10, wherein the refrigerator further comprises an icemaker disposed in the ice compartment, the variable parameter being determined when the icemaker is turned off.

13. The method of claim 9, wherein the refrigerator further comprises an icemaker disposed in the ice compartment, the variable parameter being determined when the icemaker is turned off.

14. The method of claim 9, wherein the refrigerator further comprises an icemaker disposed in the ice compartment, the method further comprising generating a warning signal responsive to receiving the request when the determined fill level does not indicate a substantially empty ice compartment, the warning signal indicating that there is ice in the ice compartment.

15. The method of claim 1, wherein the predetermined thermodynamic cycle comprises a warming phase and a cooling phase, the variable parameter being determined during one of the warming phase and the cooling phase.

16. The method of claim 15, wherein the threshold is a rate of temperature change in the ice compartment, which is determined during the one of the warming phase and the cooling phase.

* * * * *